J. F. GRABILL.
STEAM VALVE.
APPLICATION FILED JAN. 24, 1916.
1,209,145.
Patented Dec. 19, 1916.
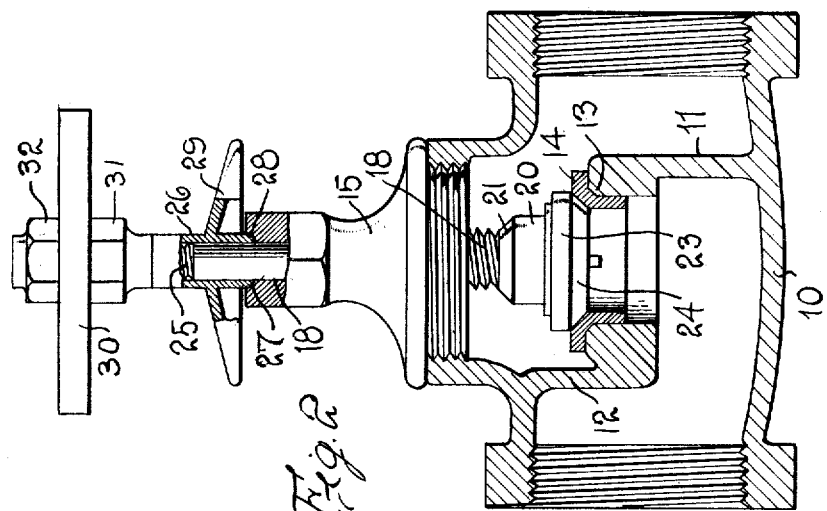
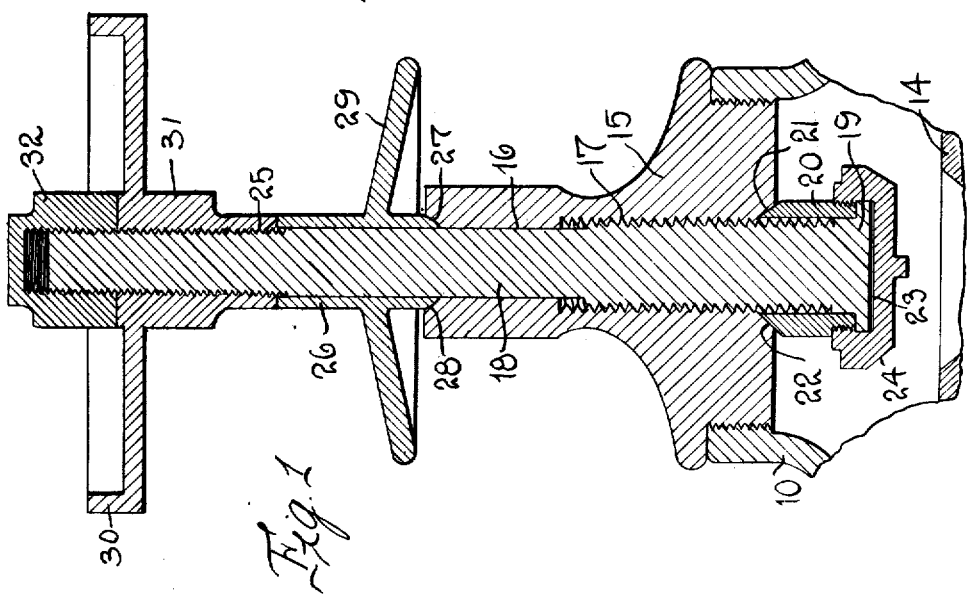
Inventor
JOHN F. GRABILL
By Watson E. Coleman
Attorney

UNITED STATES PATENT OFFICE.

JOHN F. GRABILL, OF FLORA, ILLINOIS, ASSIGNOR OF ONE-FOURTH TO EARL H. ARBUTHNOT AND ONE-FOURTH TO HORATIO C. CHAFFIN, BOTH OF FLORA, ILLINOIS.

STEAM-VALVE.

1,209,145.  Specification of Letters Patent.  Patented Dec. 19, 1916.

Application filed January 24, 1916. Serial No. 73,952.

*To all whom it may concern:*

Be it known that I, JOHN F. GRABILL, a citizen of the United States, residing at Flora, in the county of Clay and State of Illinois, have invented certain new and useful Improvements in Steam-Valves, of which the following is a specification, reference being had to the accompanying drawings.

This invention relates to steam valves, and particularly to valves wherein a stem carrying the valve passes through a bonnet and is longitudinally movable through the bonnet to close or open the valve.

In valves of this character steam is usually prevented from leaking out between the stem and the bonnet by asbestos packing disposed in the gland or packing nut in the bonnet, and the main object of my invention is to so construct a valve as to do away with this packing and the packing nut holding it in place.

Still another object is to provide the valve stem of a valve of this character with two sealing members one of which is in inoperative position when the valve is closed and the other of which is shifted to a seated position when the valve is closed or partially or fully open.

A still further object is to provide means whereby the outer sealing member may be shifted to a seated position and held in such position when the valve is entirely or partly opened. And a further object is to provide this last-named sealing member with a shield to prevent steam from blowing out upon the hand of the operator when opening and closing the valve.

Other objects will appear in the course of the following description.

My invention is illustrated in the accompanying drawings, wherein:

Figure 1 is a vertical sectional view through a steam valve constructed in accordance with my invention, only a portion of the body of the valve being shown and the valve being illustrated in open position; Fig. 2 is a side elevation of my improved valve, the valve body being shown in section and the parts being turned to a position where the valve is closed.

Referring to these figures, 10 designates the body of an ordinary valve such as is used for controlling the passage of steam from a boiler along a pipe line. This body as usual is provided with the septums 11 and 12 joined by an annulus 13 upon which a valve seat member 14 is disposed. All these parts are of any ordinary or usual construction and form no part of my invention. The bonnet 15 has screw threaded engagement with the valve body as usual, and is formed with the central bore 16, the upper portion of which is smooth and the lower portion screw threaded as at 17. Passing through the bore of the bonnet is a valve stem 18, the middle portion of which is smooth and the lower portion enlarged in diameter and screw threaded to engage the screw threads 17. The lower end of the valve stem is formed with an enlarged head 19 and surrounding the lower end of the valve stem is an annular sleeve or sealing member 20 whose upper end is beveled as at 21 to seat against a seat 22 formed in the wall of the bore. The lower end of this sleeve 20 is screw threaded for engagement with a cap 23 which fits over the lower extremity of the stem. The cap 23 constitutes the valve and is beveled as at 24 to engage with the valve seat 14. It will be seen that this valve 23 is swiveled upon the lower end of the valve stem in the manner usual with valves of this character, the sleeve 20 bearing against the upper face of the head 19.

The upper end of the valve stem 18 is threaded, as at 25, and surrounding the stem 18 and shiftable longitudinally thereon is an annular sleeve or sealing member 26, the lower end of which is beveled as at 27 to fit against a seat 28 formed in the upper end of the bonnet. That portion of the valve stem 18 which extends outward through the bonnet is smooth and the member 26 fits this smooth portion accurately. The member 26 is also provided with a central dish-shaped shield 29 which extends out beyond the stem of the bonnet, this shield being deflected inward toward the bonnet. Having screw-threaded engagement with the screw threads 25 of the stem 18 is a wheel 30 formed with a many-sided hub 31 whereby a wrench may be applied to the wheel to hold it from rotation. Engaging over the outer extremity of the stem is a tap nut 32.

With a valve of this construction it is obvious that when the valve 23 is raised from its seat 14 the sealing member 20 will engage with the seat 22 and prevent any steam passing into the bonnet between the stem and the bonnet. The sleeve or sealing member 26 is loose upon the stem and when the stem 18 is rotated to carry the valve 23 into engagement with its seat 14 to close the passage through the body the valve stem 18 will slide through the sealing member 26 until such time as the hub 31 comes in contact with the sealing member 26 and forces it to its seat 28. Under these circumstances, while the sealing member 20 has left its seat 22, the sealing member 26 has seated so that no steam can possibly escape between the bonnet and the valve stem. While the valve stem is being turned to either close or open the valve 23, a small amount of steam may escape around the valve stem, but this will be prevented coming in contact with the hand of the operator by the shield 29.

When the valve 23 is fully opened, allowing steam to pass through the valve body, the sealing member 20 will seat against the seat 21, preventing leakage of steam therethrough. When, however, the valve 23 is closed against the seat 14, the sealing member 26 is forced against the seat 28 by the hand wheel 30 which is screwed tightly against it as illustrated in Fig. 2, and inasmuch as the stem 18 is forced fully into the bonnet, the blind nut 32 is disposed adjacent to the outer end face of the hub of the hand wheel 30 and if this nut be screwed home it will prevent the passage of steam between the stem and the sealing member 26. When the valve is opened it is possible to prevent the passage of steam from around the stem the passage of steam from around the stem 18 by turning the hand wheel down on the stem, without rotating the stem, until the sealing member 26 is forced firmly to its seat. It is thus possible to hold the sealing member closed in the open position of the valve 24 and its stem 18.

When the nut 32 is in engagement with the hand-wheel 30, the hand-wheel 30 and the nut 32 are locked to the stem 18 and, under these circumstances, rotation of the hand-wheel will operate to rotate the stem. If, however, the nut 32 be released or run back from the hand-wheel then the hand-wheel can be independently rotated and will move longitudinally independently of the stem.

This valve is particularly suitable for locomotives and may be used in connection with all boilers. It may also be used for globe valves and it is obvious that the principle of the valve may be applied to all valves where there is leakage around the valve stem. It is particularly valuable in that it does away with all packing and the packing glands or nuts and does away with the necessity of renewing the packing constantly. The threads 17 may be double threads or single threads, but the pitch should be relatively quick so that the valve will open and close quickly. It is obvious that the number of threads, however, and whether the threads are single, double, or a greater number, is immaterial as far as regards the principle of the invention.

This valve has been thoroughly tested and has been found to be particularly effective.

Attention is also called to the fact that the hand wheel may be so adjusted upon the valve stem that when the valve is closed the end of the hand wheel will abut against the end of the sealing member 26, as shown in Fig. 2, and hold the sealing member closed against its seat 28, the hand wheel being held in this position by the nut 32. By screw threading the hand wheel on the stem a fine adjustment of the hand wheel may be made to compensate for any wear that may take place in the seat 28 or in the sealing member, the hand wheel being again locked in position by the jam nut 32. Thus if it be desired the hand wheel may be so adjusted as to always push the sealing member 26 against its seat when the valve is fully closed while the sealing member 20 closes against its seat 21 when the valve is fully opened. It will be seen that my improved valve is equally applicable for use on valves that are intended to be either fully opened or fully closed or on valves which may be opened partly or fully.

Having described my invention, what I claim is:

1. In a valve of the character described, a bonnet, a valve stem longitudinally moveable therethrough and carrying a valve, a sealing member having a smooth bore through which the stem loosely passes, the sealing member being independently movable longitudinally with relation to the stem into gas-tight engagement with the outer end of the bonnet, and means having screw threaded engagement with the valve stem for holding the sealing member in engagement with the outer end of the bonnet, said holding means being independently movable longitudinally of the stem with relation to the sealing member.

2. In a valve of the character described, a bonnet, a valve stem having screw-threaded engagement with the bonnet and movable longitudinally therethrough, a valve on the stem, a sealing member loosely mounted on the stem and movable longitudinally with relation thereto into or out of engagement with the outer end of the bonnet, and means having screw-threaded engagement with the stem and being movable relative to and along the stem for holding said sealing member in engagement with the bonnet.

3. In a valve of the character described, a bonnet and a valve stem movable longitudinally therethrough, a valve carried on the stem, and sealing members, one carried on the stem and being movable into engagement with the bonnet when the stem is shifted to unseat the valve and the other being longitudinally shiftable on and with relation to the stem and the valve and being normally disposed in engagement with the bonnet in all positions of the valve, means being provided for holding the last named sealing member in tight engagement with the bonnet in all positions of the valve.

4. In a valve of the character described, a bonnet, a valve stem movable longitudinally therethrough and having a valve thereon a sealing member fixedly mounted on the stem and engageable with the inner end of the bonnet when the valve stem is shifted to unseat the valve, a sealing member having free sliding engagement with the stem and coöperating with the outer end of the bonnet and movable into engagement with the outer end when the valve is shifted to its closed position, and means having screw threaded engagement with the stem for holding said last named sealing member in engagement with the bonnet.

5. In a valve of the character described, a bonnet, a valve stem movable longitudinally therethrough and carrying a valve, the bonnet being formed at its outer and inner ends with seats, sealing members, one mounted upon the inner end of the valve stem and longitudinally movable therewith and the other mounted loosely upon the valve stem and coöperating with the seat on the outer end of the bonnet, and means on the valve stem whereby it may be rotated and moved longitudinally, said means acting when shifted to one position to hold the outer sealing member into engagement with the corresponding seat in the bonnet.

6. In a valve of the character described, a bonnet, a valve stem movable longitudinally therethrough, said valve stem having screw threaded engagement with the bonnet and having a screw threaded outer end, a valve mounted upon the lower end of the valve stem, a sealing member having a beveled face mounted upon the lower end of the valve stem above the valve, the inner end of the bonnet being formed with a seat coöperating with said sealing member, a sealing member slidably mounted upon the outer end of the valve stem, the outer end of the bonnet being formed with a seat coacting with the last mentioned sealing member, a member having screw threaded engagement with the outer end of the valve stem and shiftable into engagement with the last named sealing member to hold it to its seat, and a locking nut engaging the outer end of the valve stem.

7. In a valve of the character described, a bonnet, a valve stem having screw threaded engagement therewith, a valve carried upon the lower end of the stem, a sealing member operatively mounted upon the stem and movable therewith, the inner end of the bonnet being formed to provide a seat for said sealing member, the valve stem extending out of the bonnet and being screw threaded, a sealing member slidably mounted upon said screw threaded portion of the valve stem, the outer end of the bonnet being formed with a seat for said last named sealing member, a hand wheel having screw threaded engagement with the valve stem and shiftable into engagement with the outer end of said last-named sealing member to hold it to its seat, and a nut engaging the stem and adapted to hold the hand wheel in adjusted position.

8. In a valve of the character described, a bonnet, a valve stem having screw threaded engagement with the bonnet, the inner end of the stem having a head, a valve having swiveled engagement with said head, an annular sealing member mounted upon said head and movable therewith and having a beveled inner end, the confronting end of the bonnet being formed with a seat therefor, the stem extending through the bonnet and having a screw threaded outer end, an annular sealing member slidably mounted upon the outer end of the valve stem, the confronting end of the bonnet being formed with a seat for said last-named sealing member, a hand wheel having screw threaded engagement with the outer end of the valve stem and shiftable into position to hold the last-named sealing member to its seat, and a locking nut having screw threaded engagement with the valve stem.

9. In a valve of the character described, a bonnet, a valve stem having screw threaded engagement with the bonnet, a sealing member having sliding engagement with the outer end of the valve stem and adapted to have steam-tight engagement with the bonnet, and an annular shield mounted upon said member.

10. In a valve of the character described, a bonnet, a valve stem having screw threaded engagement with the bonnet, a sealing member having sliding engagement with the outer end of the valve stem and adapted to have steam-tight engagement with the bonnet, an annular dish-shaped shield mounted upon said member, and means for holding said sealing member in engagement with the bonnet.

11. In a valve of the character described, a bonnet, a valve stem having screw threaded engagement with the bonnet, a valve on the lower end of the stem, a sealing member mounted upon the stem, the confronting end of the bonnet being formed with a seat for said sealing member, the valve stem projecting beyond the bonnet and being screw threaded, a sealing member mounted upon the last-named portion of the stem, the confronting end of the bonnet being formed with a seat therefor, the last-named sealing member being formed with a dish-shaped shield, a hand wheel having screw threaded engagement with the stem and movable into engagement with the last-named sealing member, and a nut for locking the hand wheel in place.

12. In a valve of the character described, a bonnet, a valve stem having screw-threaded engagement with the bonnet and movable longitudinally therethrough, a valve on the stem and a sealing member mounted on the stem and movable independently of the stem into gas-tight engagement with the outer end of the bonnet and means having positive engagement with the stem and movable independently thereof for holding the sealing member into gas-tight engagement with the bonnet.

13. In a valve of the character described, a bonnet, a valve stem longitudinally movable therethrough and having screw threaded engagement therewith, a valve on the stem, a sealing member having sliding engagement with and carried on the stem and movable independently of any movement of the stem into or out of engagement with the outer end of the bonnet, the outer end of the bonnet being formed with a seat with which the sealing member is adapted to have gas-tight engagement, and means having positive engagement with the stem and movable independently thereof for holding the sealing member into gas-tight engagement, said means when shifted away from its engagement with the sealing member constituting means whereby the stem may be rotated.

14. In a valve of the character described, a bonnet, a valve stem having screw-threaded engagement with the bonnet and movable longitudinally therethrough, a valve on the stem, and an annular metallic sealing member loose on the stem and independently movable longitudinally with relation to the stem and valve, the bonnet being formed with a seat into which the sealing member is adapted to fit and with which it is adapted to have gas-tight engagement, and means operatively engaging the stem but movable relative to the stem for holding said sealing member in such engagement with the bonnet.

15. In a valve of the character described, a bonnet having a bore extending entirely through it, the outer end of the bonnet being formed with a recessed seat at the intersection of the bore with the face of the bonnet, a valve stem movable longitudinally through said bore, an annular metallic sealing member slidably mounted on the stem movable longitudinally independent of the stem and having its inner end formed to fit into said seat on the bonnet and have gas-tight engagement therewith, and means movable relative to and along the stem for holding said sealing member in engagement with the seat in said bonnet.

16. In a valve of the character described, a valve casing including a bonnet and a seat disposed in spaced relation to the bonnet and facing toward the bonnet, a valve stem having longitudinal movement through the bonnet, a valve on the stem coacting with the valve seat, and a sealing member mounted on the stem and movable into gas-tight engagement with the bonnet when the valve is closed.

In testimony whereof I hereunto affix my signature in the presence of two witnesses.

JOHN F. GRABILL.

Witnesses:
C. E. HEMPHILL,
E. H. ARBUTHNOT.

Copies of this patent may be obtained for five cents each, by addressing the "Commissioner of Patents, Washington, D. C."